(12) United States Patent
Bühler et al.

(10) Patent No.: US 10,260,740 B2
(45) Date of Patent: Apr. 16, 2019

(54) METHOD AND DEVICE FOR PRODUCING SUPERHEATED STEAM BY MEANS OF THE HEAT PRODUCED IN THE BOILER OF AN INCINERATION PLANT

(71) Applicant: HITACHI ZOSEN INOVA AG, Zürich (CH)

(72) Inventors: Niculin Bühler, Würenlos (CH); Felix Koller, Schinznach Dorf (CH); Istvan Szepeshazy, Baar (CH)

(73) Assignee: HITACHI ZOSEN INOVA AG, Zurich (CH)

( * ) Notice: Subject to any disclaimer, the term of this patent is extended or adjusted under 35 U.S.C. 154(b) by 77 days.

(21) Appl. No.: 15/404,665

(22) Filed: Jan. 12, 2017

(65) Prior Publication Data
US 2017/0198901 A1    Jul. 13, 2017

(30) Foreign Application Priority Data

Jan. 12, 2016   (EP) .................................... 16150949

(51) Int. Cl.
  *F22G 1/04*   (2006.01)
  *F22B 21/34*  (2006.01)
  (Continued)

(52) U.S. Cl.
  CPC ............. *F22G 1/04* (2013.01); *F22B 21/341* (2013.01); *F22B 37/108* (2013.01); *F22G 1/02* (2013.01); *F22G 1/06* (2013.01); *F22G 3/008* (2013.01); *F22G 7/14* (2013.01); *F23G 5/00* (2013.01); *F23M 5/08* (2013.01); *F23M 5/085* (2013.01)

(58) Field of Classification Search
  CPC ........................................................ F22G 1/04
  See application file for complete search history.

(56) References Cited

U.S. PATENT DOCUMENTS 2,379,009 A * 6/1945 Kuhner ................. F22B 21/345
                                                          122/478
3,543,733 A * 12/1970 Russo, Jr. ............. F22B 37/025
                                                          122/336
(Continued)

FOREIGN PATENT DOCUMENTS

DE         102 57 305 A1   6/2004
DE    10 2010 032 612 A1   3/2012
(Continued)

*Primary Examiner* — Nathaniel Herzfeld
(74) *Attorney, Agent, or Firm* — Oliff PLC

(57) ABSTRACT

A method generates superheated steam using heat generated in a boiler of an incineration plant. The pre-superheated steam is fed to a final superheater that includes a plurality of final superheater pipes through which the pre-superheated steam is guided and is finally superheated in the process. The final superheater pipes (are arranged at least partially in at least one cavity (formed in an interior of a wall element of the boiler and/or of a bulkhead arranged in the boiler. The cavity is closed off on a boiler side at least partially by a refractory material layer and is flowed over by flue gas released during combustion. A secondary medium flows through the cavity and is heated via heat transfer from the flue gas via the refractory material layer. The heated secondary medium is fed via a secondary medium feed line to a secondary heat exchanger.

19 Claims, 4 Drawing Sheets

(51) Int. Cl.
*F23M 5/08* (2006.01)
*F22B 37/10* (2006.01)
*F22G 1/02* (2006.01)
*F22G 1/06* (2006.01)
*F22G 3/00* (2006.01)
*F22G 7/14* (2006.01)
*F23G 5/00* (2006.01)

(56) References Cited

U.S. PATENT DOCUMENTS

| | | | | |
|---|---|---|---|---|
| 5,619,933 A * | 4/1997 | Kristensen | ............ | F01K 3/247 |
| | | | | 110/234 |
| 6,269,754 B1 * | 8/2001 | Ruegg | ............ | F22B 31/045 |
| | | | | 110/234 |
| 6,381,962 B1 * | 5/2002 | Ohshita | ............ | F22B 31/045 |
| | | | | 60/645 |
| 7,434,543 B2 * | 10/2008 | Raukola | ............ | D21C 11/12 |
| | | | | 122/461 |
| 8,863,675 B2 * | 10/2014 | Gunther | ............ | F22B 37/108 |
| | | | | 110/234 |
| 2009/0050076 A1 * | 2/2009 | Dam-Johansen | ....... | F22B 31/04 |
| | | | | 122/2 |
| 2009/0145344 A1 * | 6/2009 | Dam-Johansen | ..... | F22B 31/045 |
| | | | | 110/234 |
| 2009/0194262 A1 * | 8/2009 | Roppo | ............ | F22G 3/008 |
| | | | | 165/134.1 |

FOREIGN PATENT DOCUMENTS

| | | |
|---|---|---|
| EP | 0 981 015 A1 | 2/2000 |
| EP | 2 011 972 A2 | 1/2009 |
| EP | 2 423 584 A2 | 2/2012 |
| JP | 2000-297613 A | 10/2000 |

* cited by examiner

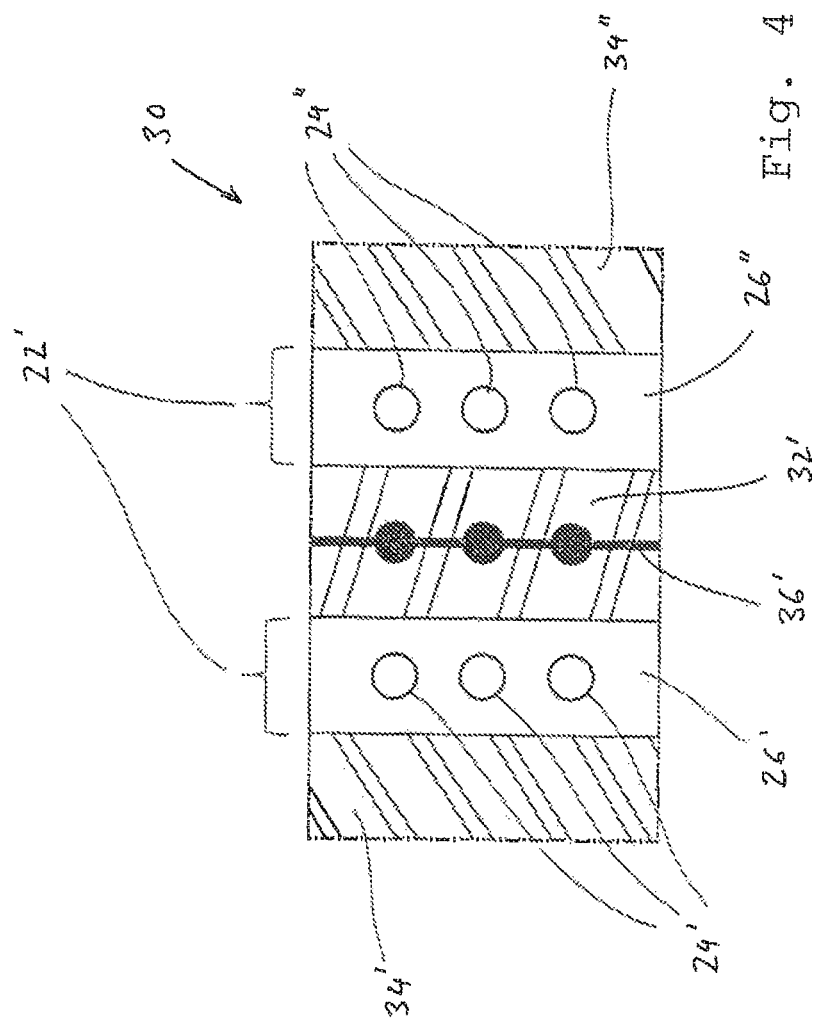

METHOD AND DEVICE FOR PRODUCING SUPERHEATED STEAM BY MEANS OF THE HEAT PRODUCED IN THE BOILER OF AN INCINERATION PLANT

BACKGROUND

The present invention relates to a method for generating superheated steam by means of the heat which is generated in the boiler of an incineration plant. The invention further relates to an apparatus for generating superheated steam by means of the heat which is generated in the boiler of an incineration plant and an incineration plant comprising such an apparatus.

Incineration plants are known to the person skilled in the art and can be used, for instance, for the combustion of waste. Such incineration plants generally have a boiler which comprises a combustion chamber for burning the material which is intended to be burnt and boiler passes which are adjacent thereto in the flow direction of the flue gas.

In the boiler passes, there are arranged at least partially heat exchangers which are configured, on the one hand, to recover in a profitable manner the highest possible proportion of the thermal energy which is released during the combustion and, on the other hand, to cool the components of the incineration plant which have been acted on by the hot flue gas and the flue gas itself.

Generally, in these heat exchangers, water is used in the liquid or gaseous state as a heat exchanger fluid. The steam which is produced when water is used can, for instance, be used to produce electrical power.

In this case, the production of steam in order to produce electrical power is carried out in principle in three stages. In a first stage, the water is heated in the liquid state up to a maximum corresponding to the evaporation temperature. In a second stage, the water is evaporated, thus brought from the liquid into the gaseous state, without the temperature increasing in this case. In a third stage, the steam is then superheated, that is to say, it is further heated to a temperature which is above the evaporation temperature, before it is ultimately supplied to a steam turbine for power production.

In accordance with these three stages, pre-heating, evaporation and superheating, incineration plants have different heat exchangers. Whilst the evaporators which are configured for the evaporation are often constructed in the form of diaphragm walls, that is to say, as pipes which are securely connected to each other by means of webs, the pre-heaters and superheaters which are configured for the pre-heating or superheating are generally in the form of pipe bundles or tubular coils in the case of horizontal heat exchangers and in the form of pipe rows (or "harps") which are connected via collectors in the case of suspended heat exchangers.

Whilst the energy from flue gas in a high temperature range above 500° C. is transmitted to the heat exchanger fluid substantially by means of radiation, it is carried out at lower temperatures substantially by means of convection. Accordingly, the boiler passes are sub-divided into a radiation portion (or "radiation passes") and a convection portion (or "convection passes").

However, particularly with superheaters which are generally arranged in the convection portion, it should be ensured that they are not subjected to excessively high wall or material temperatures. It is thus possible, in particular with a flue gas temperature which is substantially above 600° C., that corrosion problems may occur. These result from the fact that at such high flue gas temperatures still-gaseous corrosion-inducing flue gas components condense on the cooler pipe walls or the coatings on the pipe walls and are available at that location for corrosion processes. As a result of this limitation with regard to the application temperature, superheaters are generally operated, on the one hand, at flue gas temperatures less than 650° C. and, on the other hand, superheating temperatures less than approximately 430° C. are desired.

Nonetheless, there are proposed concepts which are intended to prevent corrosion problems even at higher superheating temperatures:

The general problem of minimizing the corrosion on heat exchanger pipes in a steam boiler installation is combated, for instance, according to DE-A-102010032612 in that the heat exchanger pipes are surrounded by ceramic material.

There is further described in JP 2000297613 a method in which a secondary medium is heated by means of a heat exchanger which is located in the flue gas flow and the secondary medium is used as a heat source for superheating water steam. Since the secondary medium has a very much lower pressure than the steam which is intended to be produced, pipes of conventional boiler steels or ceramic material can be used in the heat exchanger. In order to obtain adequate superheating, the heat exchanger surface-areas which are required in accordance with the technology of JP 2000297613 are, however, very large and consequently cost-intensive.

In addition in EP-A-2423584 there is proposed a steam producer which contains a wall superheater which comprises a plurality of pipelines through which superheated steam flows and which are protected from the flue gas which is produced during the combustion process by means of plate-like elements of a corrosion-resistant material.

Furthermore, EP-A-2011972 relates to the problem of using the thermal value of the fuels at a higher exergetic level and consequently enabling an increase of the degree of electrical efficiency without the boiler being endangered by corrosion. To this end, it is proposed to incorporate in the walls of a combustion chamber which are built up with a fire-resistant material channel-like cavities in order to guide a gaseous heat-carrying medium which is directed afterwards to the superheater and which is used at that location to superheat the steam.

Reference is further made to EP-A-0981015 which relates to the problem of providing a steam producer for superheated steam for an incineration plant with corrosive flue gases in which a high superheating temperature can be achieved without corrosion at the final superheater. To this end, it is proposed in EP-A-0981015 that plates be arranged on a wall of the radiation portion, wherein there is provided between the plates and the wall a space in which at least a portion of a superheater is arranged as a wall superheater and which contains a non-corrosive gaseous atmosphere. In this instance, the gaseous atmosphere flows through the space in the lowest possible quantity.

A method for protecting heat exchanger pipes which extend freely in the furnace and which are suspended on the ceiling of the furnace is further disclosed in DE-A-102013000424; according to this method, a gas is also supplied between the heat exchanger pipe and the ceramic element which surrounds the heat exchanger pipe.

The disadvantage of the technology described in EP-A-0981015 is that the energy balance which is produced is poor:

Although according to EP-A-0981015 the quantity of air flowing through the corrosion-free space is intended to be kept as low as possible, in practice a portion of the heated air always flows via gaps, cracks or pores into the combustion chamber. Taking into account the large surface-area required and the relatively high excess pressure which has to be maintained in the corrosion-free space, the quantity of heated air which can be discharged into the combustion chamber is consequently relatively high. The thermal energy contained in the heated air is consequently guided into the combustion chamber in the unused state, whereby the flue gas volume flow and therefore the flue gas losses of the boiler are increased, which is unfavorable from the point of view of energy.

Furthermore, the technology in accordance with EP-A-0981015 has the disadvantage that the final superheating or the final superheated quantity of steam cannot be controlled in any way.

SUMMARY

An object of the present invention is consequently to provide a method for producing superheated steam by means of the heat which is produced in the boiler of an incineration plant, which method ensures a high superheating temperature and consequently a high steam temperature without corrosion on the superheater and which at the same time ensures an optimal use of the thermal energy which is available. In addition, a simple and precise control of the power of the installation is intended to be able to be ensured.

According to the method according to the invention, pre-superheated steam is fed to a final superheater which is present in the form of a plurality of final superheater pipes through which the pre-superheated steam is directed and finally superheated.

The final superheater pipes are in this instance arranged at least partially in at least one cavity which is configured in the interior of a wall element of the boiler and/or of a bulkhead which is arranged in the boiler, and is closed off on the boiler side at least partially by way of a refractory material layer and is flowed over by the flue gas which is released during the combustion and which is acted on with thermal energy which is contained therein.

According to the invention, the cavity is flowed through by a secondary medium. Consequently, flowing of the secondary medium is induced in a selective manner, for instance, by means of a fan, as will be set out further below.

Whilst flowing through the cavity, the secondary medium is heated via heat transfer from the flue gas via the refractory material layer. The secondary medium which is heated in this way is fed via a secondary medium feed line to a secondary heat exchanger for further use of the heat contained in the secondary medium.

As mentioned, the cavity in which at least some of the final superheater pipes are arranged is constructed inside a wall element of the boiler and/or a bulkhead which is arranged in the boiler. The term "wall element" also includes in this instance both elements of the boiler covering wall, that is to say, the wall which terminates the inner side of the boiler with respect to the outer side, and elements of an intermediate boiler wall which is located between individual boiler passes in order to direct the flow of the flue gas.

As also mentioned, the cavity is terminated at the boiler side by means of a refractory material layer. The term "boiler side" is intended in this instance to be understood to be the side which faces the inner side of the boiler and which is consequently directly exposed to the hot flue gas. Whilst, of the sides of a wall element, generally only one is at the boiler side, both sides are at the boiler side in the case of a bulkhead which is arranged inside the boiler, that is to say, directly exposed to the hot flue gas.

The secondary medium is generally corrosion-free, that is to say that it is substantially free from materials which are corrosive with respect to the final superheater pipes under operating conditions. It is consequently ensured that there is a corrosion-free atmosphere in the cavity and the final superheater pipes are not subjected to any corrosion or only to a very low level of corrosion even at relatively high superheating temperatures. According to a particularly simple and therefore preferred embodiment, air is used as a secondary medium.

In contrast to the superheater disclosed in EP-A-0981015 in which the quantity of air which flows through the corrosion-free space is intended to be kept as small as possible, according to the method according to the invention a flow of the secondary medium is induced in a selective manner. In further contrast to EP-A-0981015, the secondary medium which is heated during the throughflow is selectively directed via a secondary medium supply line into a secondary heat exchanger. Consequently, on the one hand, the thermal energy contained in the secondary medium can be used at an optimum temperature level, which is advantageous from an exergetic viewpoint. On the other hand, as a result of the fact that flow around the final superheater pipes is permanent, an optimization of the heat transfer to the steam contained in the final superheater pipes is obtained.

The secondary medium consequently has a triple function: firstly, it acts as a heat-carrying medium, whose received heat is further used by the secondary heat exchanger; secondly, the secondary medium also acts as a non-corrosive protective atmosphere for protecting the final superheater pipes; and, thirdly, it serves to optimize the heat transfer to the steam contained in the final superheater pipes.

The thermal energy contained in the secondary medium can be used in a variety of ways. According to a particularly preferred embodiment, in the secondary heat exchanger heat is transferred from the secondary medium to the steam to be superheated. In this instance, it is particularly preferable for the transfer to be carried out to the steam which is intended to be superheated before it is fed to the final superheater. This also enables inter alia a simple and precise control of the final superheating and furthermore the entire installation. It is further conceivable for there to be produced alternatively or additionally in the secondary heat exchanger hot water which can be used as remote heat, for example, for domestic heating, or for air which is used as combustion air to be preheated.

If in the secondary heat exchanger heat from the secondary medium is transferred to the steam which is intended to be superheated, the temperature of the steam which is intended to be superheated in the secondary heat exchanger can generally be increased by up to approximately 50° C. Since the steam which is supplied to the final superheater is consequently heated to a higher level than would be the case without passing through the secondary heat exchanger, it is on the whole possible to achieve a higher final superheating temperature or, if the final superheating temperature is maintained, a reduction of the final superheating surface-area.

According to another preferred embodiment, the secondary medium, after the transfer of the heat contained in the secondary medium has been carried out in the heat exchanger, is at least partially guided back to the cavity which is constructed at the inner side of the wall element or the bulkhead. The secondary medium which generally still contains residual heat thereby remains in the circuit, which further contributes to an optimum energy balance of the method according to the invention.

Generally, the secondary medium has a pressure which is higher compared with the pressure inside the boiler. It is consequently intended to be ensured that, as a result of the leaks in the refractory material layer which can hardly be avoided in practice as a result of assembly and operation, corrosive flue gas can be introduced into the cavity.

In order to produce the pre-superheated steam, superheaters are preferably used as used in the boiler of previously known incineration plants. They are arranged inside the boiler and are generally constructed in the form of superheater pipes which are directly exposed to the flue gas. The present invention can consequently be integrated in a relatively simple manner in already-existing incineration plants which are provided with superheaters, wherein these superheaters can be used for pre-superheating.

Preferably, the wall element and/or the bulkhead in which at least some of the final superheater pipes are arranged is arranged in the radiation portion of the boiler.

In this regard, it is further preferable for the wall element and/or the bulkhead to be arranged in a portion of the boiler in which the flue gas temperature is from 600° C. to 1200° C. Consequently, it can be ensured that a very high final superheating temperature is obtained without corrosion problems occurring.

Ultimately, it may be possible using the method according to the invention, after the final superheating, for superheated steam to be present at a temperature in the range from 350° C. to 650° C., preferably from 400° C. to 600° C., more preferably from 450° C. to 550° C., and at a pressure in the range from 40 to 150 bar, which enables an optimum energy decoupling using a steam turbine for power production.

Typically, the first radiation pass of the boiler has injectors by means of which secondary air and optionally recirculated flue gas is introduced for secondary combustion of the combustible gases which are still present after the primary combustion. These injectors are generally arranged in at least one injection plane, which preferably extend(s) horizontally. In a particularly preferred manner, the injectors are distributed over a plurality of injection planes in this case.

From a structural viewpoint, it is particularly preferable for the wall element in which at least some of the final superheater pipes are arranged to be arranged in the radiation portion above the uppermost injection plane. Consequently, for the injectors of already-existing incineration plants, no adaptations or only minimal adaptations are required. In particular, it is not necessary to guide the injectors through the wall elements which contain the final superheater pipes.

As a result of the arrangement of the wall element above the uppermost injection plane, the present invention differs very substantially from installations in which the walls which are formed from fire-resistant material already begin below the uppermost injector. In particular, the present invention differs from installations in which the walls which are formed from fire-resistant material already begin directly above the combustion grate which is the case in most current installations. With the mentioned preferred arrangement of the present invention, the loads of the wall element are thus absorbed by the basic construction of the boiler wall, in particular by the diaphragm evaporator wall which is generally present in the radiation portion in the boiler wall or—when constructed as a bulkhead—are introduced directly into the steel boiler construction which is generally used.

According to another preferred embodiment, in the wall element and/or in the bulkhead, in the cavity of which the final superheater pipes are arranged, a diaphragm evaporator wall which forms an evaporator is further introduced. In this instance, it is particularly preferable for an insulation layer to be applied to the diaphragm evaporator wall.

The insulation layer which is applied to the diaphragm evaporator wall, in particular the thickness thereof, is preferably selected in such a manner that the quantity of thermal energy transmitted to the diaphragm evaporator wall is maintained within specific limits so that the quantity of thermal energy is provided in sufficient quantity for the desired superheating.

In specific terms, consequently, the cavity is preferably constructed between an insulation layer of the wall element, which layer is applied to the diaphragm evaporator wall, and/or bulkhead and the refractory material layer which is arranged with spacing from the insulation layer, as additionally set out, for instance, further below together with the Figures.

According to another aspect, the present invention in addition to the method described above additionally relates to a device for producing superheated steam by means of the heat produced in the boiler of an incineration plant.

This comprises by analogy with the above description of the method according to the invention a final superheater for final superheating of pre-superheated steam, wherein the final superheater is in the form of a plurality of final superheater pipes which are arranged at least partially in a cavity which is constructed inside a wall element and/or a bulkhead, and which at least at one side is terminated at least partially by a refractory material layer. During operation of the device, the refractory is material layer which is arranged at the boiler side is flowed over by the flue gases and acted on by the thermal energy which is contained therein, as described in connection with the method according to the invention.

The device additionally comprises by way of further analogy with the method described above a secondary heat exchanger which is connected in terms of flow to the cavity by means of a secondary medium supply line.

As set out, using the secondary heat exchanger, it is possible to make the thermal energy contained in the secondary medium useful, which contributes to an optimum energy balance of the device.

In particular, the secondary heat exchanger is preferably constructed so as to transfer heat from the secondary medium to the steam which is intended to be superheated. In a particularly preferred manner, the construction is configured so as to transfer heat from the secondary medium to the steam which is intended to be superheated before it is supplied to the final superheater. Consequently, the secondary heat exchanger preferably has a first heat exchanger line to direct the secondary medium and a second heat exchanger line which is separated therefrom by means of a heat-permeable wall to direct the pre-superheated steam.

Furthermore, the secondary heat exchanger is preferably constructed so as to return the secondary medium at least partially into the cavity after the heat contained in the secondary medium has been transferred in the heat exchanger. Consequently, the device preferably has a secondary medium return line which extends from the secondary heat exchanger to the cavity and which is consequently connected in terms of flow.

All other features which are described as being preferred in connection with the method according to the invention are also preferred features of the device according to the invention and vice versa.

Furthermore, the present invention, in addition to the method described and the device described, also relates to an incineration plant comprising such a device.

In this instance, the features which are described as being preferred in connection with the method according to the invention and the device according to the invention are also preferred features of the incineration plant.

BRIEF DESCRIPTION OF THE DRAWINGS

The invention is further illustrated with reference to the appended Figures, in which:

FIG. 4 is a schematic cross-section of a bulkhead for use in a device according to the invention.

DETAILED DESCRIPTION OF EMBODIMENTS

Figure 1:
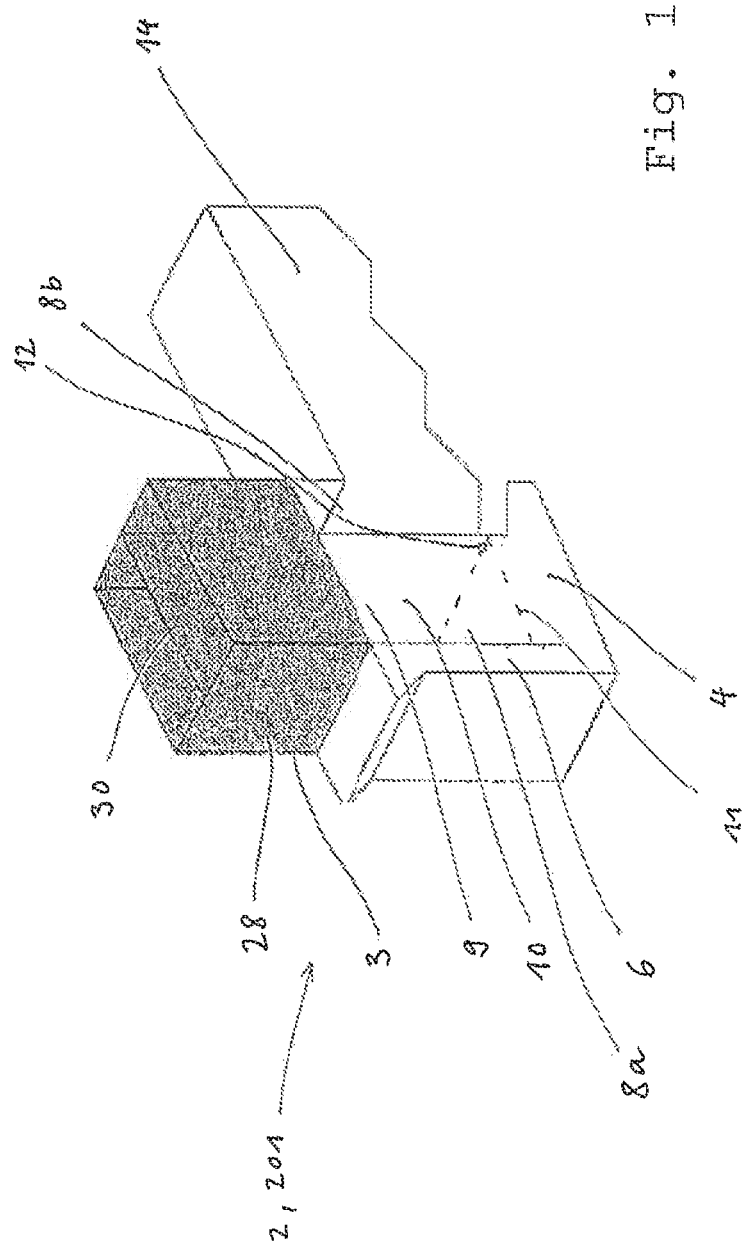
FIG. 1 is a schematic illustration of a portion of an incineration plant according to the invention in which the position of the final superheater is indicated.

The incineration plant 2 which is shown in FIG. 1 and which is in the form of a waste incineration plant 201 comprises a boiler 3 in which there is constructed a combustion chamber 4 in which waste which is introduced via a supply shaft 6 is burnt with primary air being supplied, wherein there is produced flue gas which, depending on the fuel which has been used, is corrosive to a greater or lesser extent.

Two sequential vertical boiler passes 8a, 8b are arranged downstream in the direction of the flue gas. In this instance, in the first vertical boiler pass, there is constructed an afterburning zone 10 with which injectors for supplying secondary air and where applicable recirculated flue gas are associated. These injectors are distributed over a plurality of injection planes. Of the injectors which are arranged in the injection plane 11, only one injector 12 is shown in FIG. 1.

The vertical boiler passes 8a, 8b have diaphragm evaporator walls which are acted on with the thermal energy which is released during the combustion. (Corresponding diaphragm evaporator walls are described further below in connection with FIG. 3.) Since in these boiler passes the transfer of energy from the flue gas is carried out by means of flame and gas radiation to the heat exchangers—specifically the diaphragm evaporator walls—these boiler passes form the radiation portion 9 (or the radiation passes) of the boiler 3 and are—since no additional heat exchangers around which gas flows are contained—also referred to as empty passes.

Figure 2:
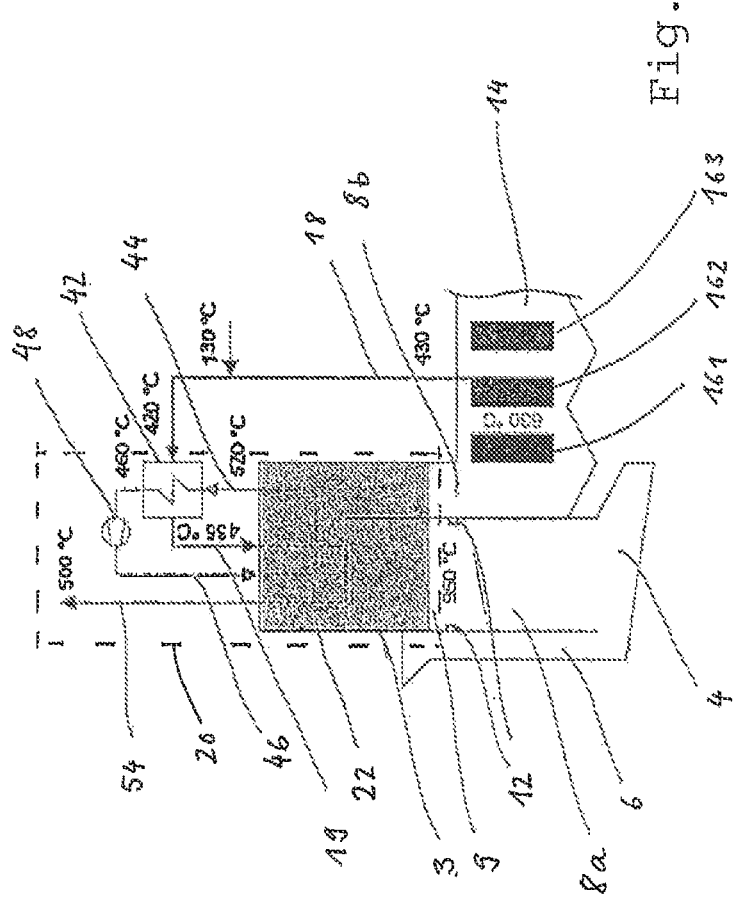
FIG. 2 is a schematic longitudinal section of a portion of an incineration plant according to the invention in which the extent of the pipes for the steam which is intended to be superheated and the secondary medium are set out.

The second of the two radiation passes, that is to say, the radiation pass 8b, is adjoined by a horizontal boiler pass 14 in which—as can be seen for instance in FIG. 2—there are a large number of heat exchangers 16 to which the energy is transferred substantially by means of convection to the heat exchanger fluid which is located therein, more specifically to water or water steam. This boiler pass 14 is consequently also referred to as a convection pass.

As can be seen in FIG. 2, there are present in the convection pass superheaters 161, 162, 163 in which water steam from the boiler drum is pre-superheated. Furthermore, in the convection pass there may be at least one protection evaporator and at least one economizer or preheater.

Figure 3:
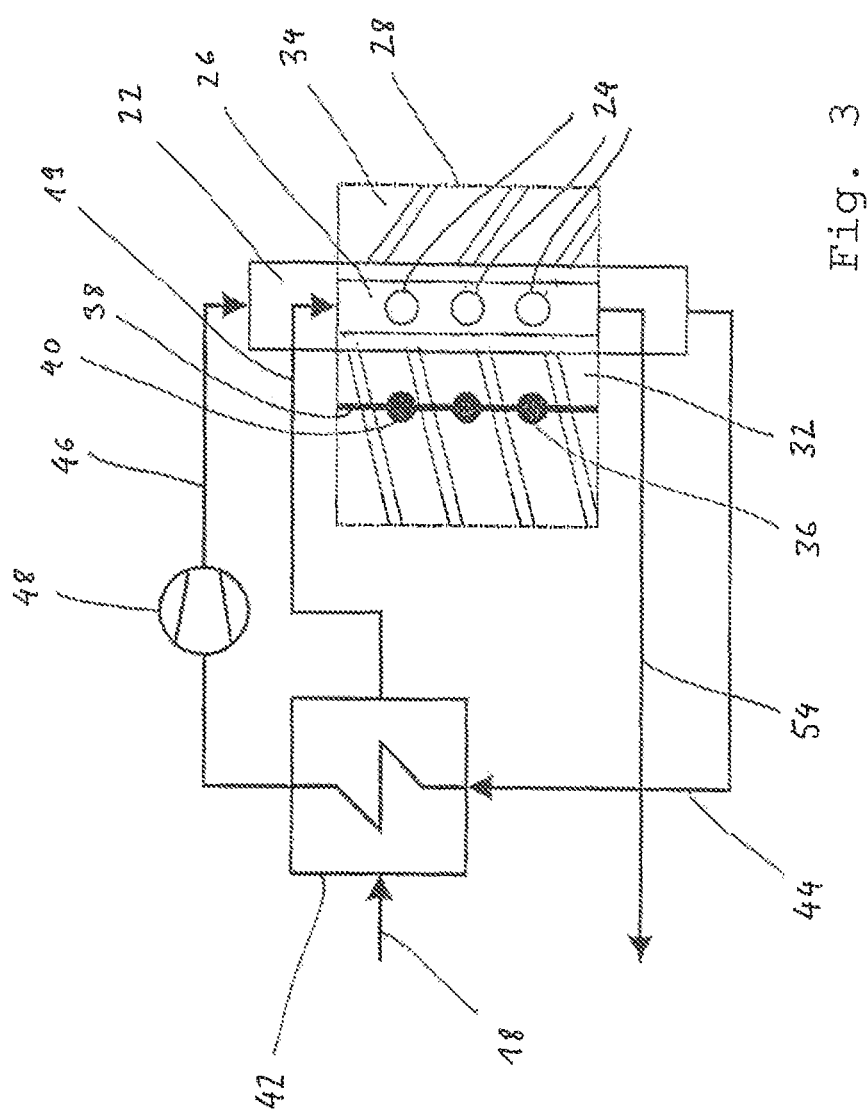
FIG. 3 is a schematic illustration of a device according to the invention comprising a final superheater in which the final superheater pipes are arranged in a cavity, which is constructed in a wall which is illustrated in cross-section, and a secondary heat exchanger which is connected in terms of flow to the final superheater.

From the superheaters, the pre-superheated steam is supplied via a primary steam line 18 to a device 20 which comprises a final superheater 22, as illustrated for instance in FIG. 3 or 4, and a secondary heat exchanger 42.

The final superheater 22 shown in FIG. 3 is in this instance constructed in the form of a plurality of final superheater pipes 24 which are arranged in a cavity 26, which is constructed inside a wall element 28 of the boiler 3 which—as shown in FIG. 1—is arranged above the uppermost injection plane 11 in the uppermost region of the first and second boiler passes. Specifically, according to the embodiment shown in FIG. 3, the cavity 26 is constructed between an insulation layer 32 of the wall element and a refractory material layer 34 which is spaced apart therefrom and which terminates the cavity 26 at the boiler side. The insulation layer 32 is applied to the diaphragm evaporator wall 36 which has already been described above and which is formed by evaporator pipes 40 which are connected to each other by means of webs 38.

A secondary medium, in the specific instance air, flows through the cavity 26 which is connected in terms of flow by means of a secondary medium supply line 44 to a secondary heat exchanger 42.

The secondary heat exchanger 42 according to FIG. 2 is constructed so as to transfer heat from the secondary medium to the steam which is supplied via the primary steam line 18 and which is intended to be further superheated before it is supplied to the final superheater 22 via a secondary steam line 19. In specific terms, the secondary heat exchanger 42 has for the heat transfer a first heat exchanger line, through which the secondary medium is directed, and a second heat exchanger line which is separated therefrom by means of a heat-permeable wall and through which the pre-superheated steam is directed.

In order to return the air to the cavity 26 again after the heat transfer has been carried out in the secondary heat exchanger, there is a secondary medium return line 46 which leads from the secondary heat exchanger 42 to the cavity and which is consequently connected in terms of flow and with which a fan 48 is associated.

In contrast to the embodiment shown in FIG. 3, according to the final superheater 22' shown in FIG. 4 the cavity 26' or 26", in which the final superheater pipes 24' and 24" are arranged, is constructed inside a bulkhead 30 which is arranged in the boiler. In contrast to the wall element shown in FIG. 3, flue gas flows around it at both sides. Accordingly, in the bulkhead 30 illustrated in FIG. 4, the insulation layer 32' which is applied to the diaphragm evaporator wall 36' is surrounded at both sides by a refractory material layer which is spaced apart therefrom, wherein, at one of the two sides, a first refractory material layer 34' terminates a first cavity 26' and at the other side a second refractory material layer 34" terminates a second cavity 26". The refractory material layers 34', 34" may, for instance, be joined by means of fire-resistant tiles.

According to the incineration plant shown in FIG. 1, both wall elements which extend in the specifically shown embodiment at all sides of the boiler from a lower limit as far as the boiler ceiling and also at least one bulkhead may be provided at the same time.

According to the purely exemplary diagram which is specifically shown in FIG. 2, there is during operation at the input of the convection pass a flue gas temperature of 630° C., whereby by means of the superheater which is arranged therein a pre-superheating to 430° C. takes place. The pre-superheated steam, after a temperature control using an injection cooler, is supplied to the secondary heat exchanger 42 at a temperature of approximately 420° C.

In the radiation passes, the refractory material layer 34 or 34', 34" shown in FIGS. 3 and 4 is acted on by thermal energy which is released during the combustion, wherein in the example which is specifically shown the flue gas temperature in the first radiation pass at the input to the region of the final superheater 22 is 950° C.

By means of heat transfer via the refractory material layer, on the one hand, the pre-superheated steam which is directed by the final superheater pipes 24 or 24', 24" is in the example which is specifically shown finally superheated to a temperature of 500° C. On the other hand, the air which flows through the cavity 26 or 26', 26" and which acts as a corrosion protection for the final superheater pipes is also heated by means of heat transfer.

The air which is heated in this manner is then supplied in the example which is specifically shown at a temperature of approximately 520° C. via the secondary medium supply line 44 to the secondary heat exchanger 42, where heat is transferred to the pre-superheated steam so that the pre-superheated steam is further heated to approximately 435° C. before it is supplied to the final superheater 22. The air is accordingly returned according to the example shown at a temperature of approximately 460° C. by means of the fan 48 via the secondary medium return line 46 to the cavity 26 or 26', 26", whereby the secondary medium circuit is closed.

As a result of the additional heating of the pre-superheated steam using the secondary medium in the secondary heat exchanger, it is on the whole possible to achieve a higher final superheating temperature or, however, if the final superheating temperature is maintained, a reduction in the final superheating surface-area.

The final superheated steam is finally supplied via an output line 54 to a steam turbine in order to produce electrical power.

LIST OF REFERENCE NUMERALS

2; 201 Incineration plant; waste combustion plant
3 Boiler
4 Combustion chamber
6 Supply shaft
8a,b Vertical boiler passes
9 Radiation portion
10 Afterburning zone
11 Injection plane
12 Injector
14 Horizontal boiler pass
16 Heat exchanger (convection)
161-163 Superheater
18 Primary steam line
20 Device
22, 22' Final superheater
24, 24', 24" Final superheater pipes
26, 26', 26" Cavity
28 Wall element
30 Bulkhead
32, 32' Insulation layer
34, 34', 34" Refractory material layer
36, 36' Diaphragm evaporator wall
38 Webs
40 Evaporator pipes
42 Secondary heat exchanger
44 Secondary medium supply line
46 Secondary medium return line
48 Fan
54 Output line

The invention claimed is:

1. A method for generating superheated steam by using heat generated in a boiler of an incineration plant,
the boiler comprising a final superheater comprising a plurality of final superheater pipes, the final superheater pipes being arranged at least partially in at least one cavity formed in an interior of a wall element of the boiler and/or formed in an interior of a bulkhead arranged in the boiler, wherein the cavity is closed off on a boiler side at least partially by a refractory material layer that is flowed over by flue gas released during combustion, the method comprising:
flowing a secondary medium through the cavity, thereby heating the secondary medium via heat transfer from the flue gas via the refractory layer;
feeding the heated secondary medium via a secondary medium feed line to a secondary heat exchanger; and
feeding pre-superheated steam through the final superheater pipes to finally superheat the pre-superheated steam to a temperature in a range of from 450° C. to 650° C.

2. The method as claimed in claim 1, wherein, in the secondary heat exchanger, heat is transferred from the secondary medium to the pre-superheated steam before the pre-superheated steam is fed through the final superheater pipes.

3. The method as claimed in claim 2, wherein a temperature of the pre-superheated steam is increased by up to 50° C. by way of the heat transfer in the secondary heat exchanger.

4. The method as claimed in claim 1, wherein the pre-superheated steam is generated by at least one superheater other than the final superheater arranged in an interior of the boiler.

5. The method as claimed in claim 4, wherein the at least one superheater is arranged in a convection pass of the boiler.

6. The method as claimed in claim 1, wherein the secondary medium is substantially free of substances which are corrosive with respect to the final superheater pipes.

7. The method as claimed in claim 6, wherein the secondary medium is air.

8. The method as claimed in claim 1, wherein the secondary medium is returned at least partially into the cavity after the transfer of the heat which is contained in the secondary medium has taken place in the secondary heat exchanger.

9. The method as claimed in claim 1, wherein the wall element and/or the bulkhead, in which the final superheater pipes are at least partially arranged, are/is arranged in a radiation part of the boiler.

10. The method as claimed in claim 9, wherein:
the radiation part comprises injection nozzles arranged in at least one injection plane, and
the final superheater pipes are arranged at least partially in the wall element, which is arranged in the radiation part above an uppermost injection plane.

11. The method as claimed in claim 1, wherein the wall element and/or the bulkhead, in which the final superheater pipes are at least partially arranged, are/is arranged in a part of the boiler in which the flue gas temperature is from 600° C. to 1200° C.

12. The method as claimed in claim 1, wherein the pre-superheated steam is finally superheated to a temperature in a range of from 450° C. to 550° C. at a pressure in a range of from 40 bar to 150 bar.

13. The method as claimed in claim 1, wherein the wall element and/or the bulkhead comprise/comprises a diaphragm evaporator wall that forms an evaporator.

14. The method as claimed in claim 13, wherein the cavity is formed in the wall element and/or the bulkhead between an insulation layer, which is applied to the diaphragm evaporator wall, and the refractory material layer, which is spaced apart from the insulation layer.

15. The method as claimed in claim 1, wherein the heated secondary medium flows directly from the cavity to the secondary heat exchanger without being subjected to other heat exchange stages, and the heated secondary medium flows directly from the secondary heat exchanger to the cavity without being subjected to the other heat exchange stages.

16. An apparatus for generating superheated steam using heat generated in a boiler of an incineration plant, the apparatus comprising:

a final superheater for finally superheating pre-superheated steam to a temperature in a range of from 450° C. to 650° C., the final superheater comprising a plurality of final superheater pipes arranged at least partially in a cavity formed in an interior of a wall element and/or an interior of a bulkhead, wherein the cavity is closed off at least on one side at least partially by a refractory material layer; and a secondary heat exchanger that is flow-connected to the cavity via a secondary medium feed line.

17. The apparatus as claimed in claim 16, wherein the secondary heat exchanger is configured to transfer heat from a secondary medium to a pre-superheated steam before the pre-superheated steam is fed to the final superheater.

18. An incineration plant comprising an apparatus as claimed in claim 16.

19. The apparatus as claimed in claim 16, wherein the secondary heat exchanger and the cavity are arranged such that a secondary medium flows directly from the cavity to the secondary heat exchanger without being subjected to other heat exchange stages, and the secondary medium flows directly from the secondary heat exchanger to the cavity without being subjected to the other heat exchange stages.

* * * * *